INVENTOR.
IVAN L. BLOWERS
BY
OSTROLENK, FABER, GERB & SOFFEN
ATTORNEYS

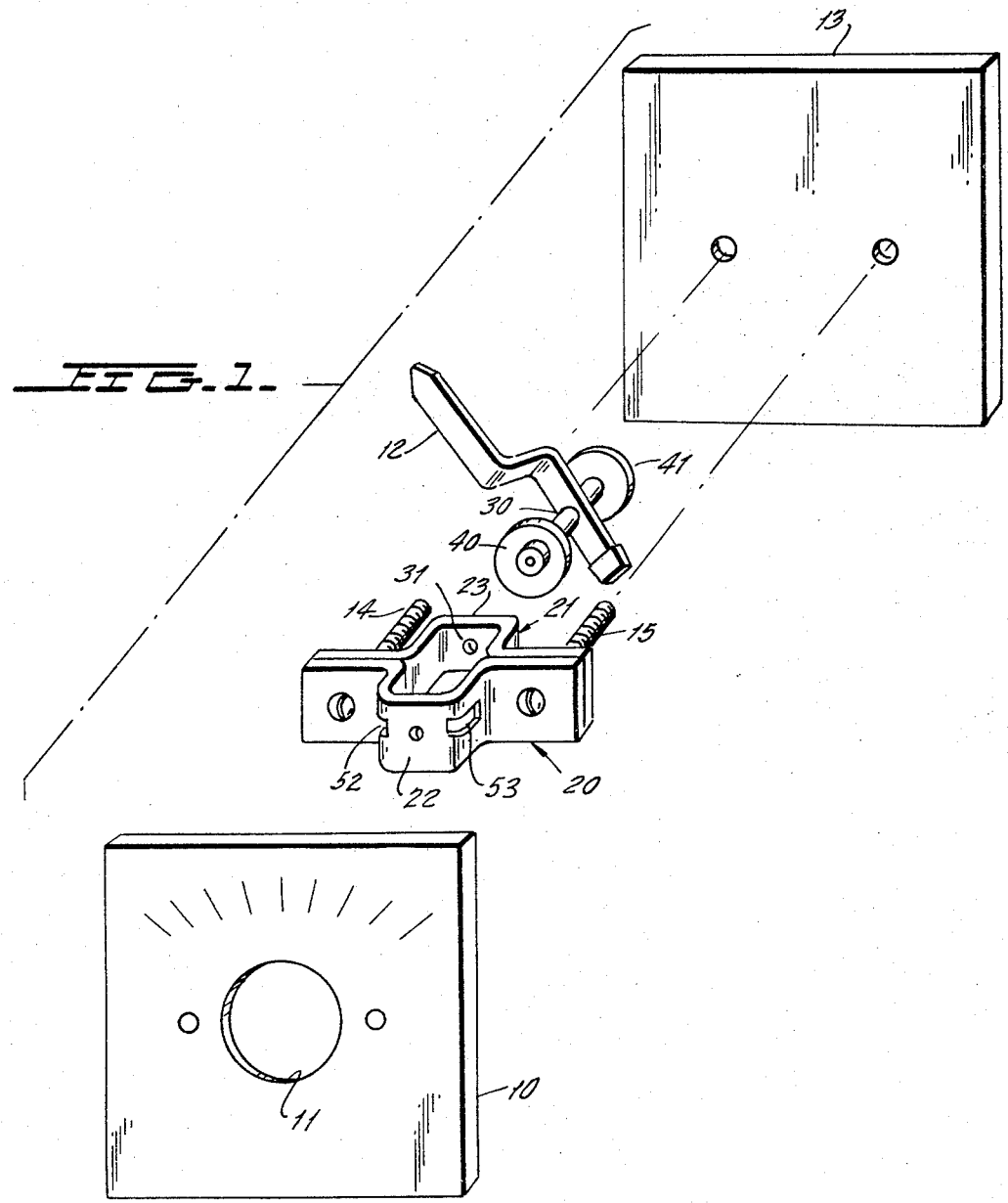

United States Patent Office 3,414,817
Patented Dec. 3, 1968

3,414,817
SENSITIVE HIGH CURRENT AMMETER HAVING PLURAL MAGNETIC ARMATURES RESPONSIVE TO PARALLEL CONDUCTORS
Ivan L. Blowers, Otsego, Mich., assignor to Kal-Equip Company, Otsego, Mich., a corporation of Michigan
Filed Oct. 23, 1965, Ser. No. 504,017
5 Claims. (Cl. 324—146)

This invention relates to ammeters, and more specifically relates to a high current ammeter for measuring currents of the order of 25 amperes and more, wherein the sensitivity of the ammeter is increased by using a mechanical support frame for the ammeter pointer which is formed of two parallel conductors that cooperate with respective permanent magnets carried on the pointer.

In accordance with the invention, two parallel conductive members carry the current to be measured and form the mechanical support frame for the pointer. The current through these conductive members create respective magnetic fields around respective permanent magnets secured to the pointer shaft. These permanent magnets have opposite magnetic polarities with respect to one another, thereby to cancel out extraneous magnetic fields, but will have torques imposed on them by the current through the current-carrying frame which are in the same direction and are related to the current through their respective current carrying frame. Therefore, an extremely inexpensive, but relatively high sensitivity instrument is provided for the measurement of relatively large currents.

Accordingly, a primary object of this invention is to provide a novel inexpensive ammeter for the measurement of relatively high currents.

Another object of this invention is to provide a novel high current ammeter wherein the main conductive path through the ammeter further serves as a mechanical support means for the ammeter pointer shaft.

Yet another object of this invention is to provide a novel high current ammeter wherein the pivot shaft for the pointer carriers permanent magnets at either end thereof which are oppositely poled and which are supported between parallel conductors which define the main current path through the instrument.

These and other objects of this invention will become apparent from the following description when taken in connection with the drawings, in which:

FIGURE 1 is a perspective diagram partially exploded which illustrates the novel ammeter of the invention.

Figure 3:
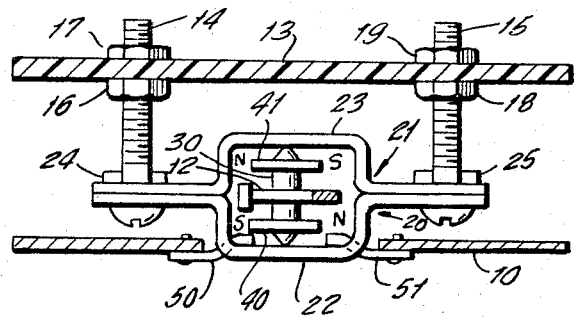
FIGURE 3 is a cross-sectional view of FIGURE 2 taken across the line 3—3 in FIGURE 2.
Figure 2:
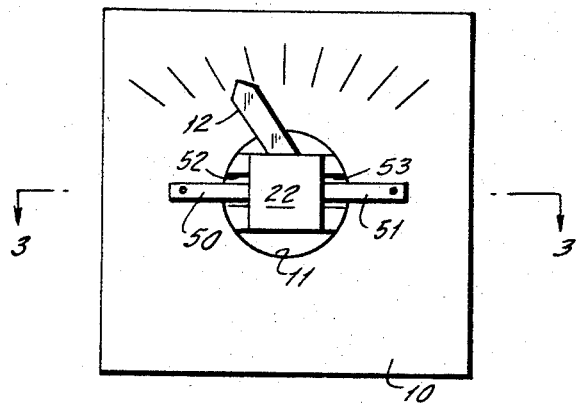
FIGURE 2 is a front view of the ammeter of the invention.

Referring first to FIGURES 1, 2 and 3, I have illustrated therein the novel ammeter which includes a calibrated dial plate 10 which has an opening 11 therein through which the ammeter pointer 12 may extend to bear upon the calibrations on the surface of dial 10.

A rear support plate 13 which is preferably of insulation material is then provided which receives bolts 14 and 15 which may serve as the terminals for the ammeter. The bolts 14 and 15 are more particularly secured to back plate 13 as by pairs of nuts 16–17 and 18–19, best shown in FIGURE 3.

A suitable housing (not shown) is then provided for holding the dial plate 10 and rear support plate 13 in position with respect to one another in the usual manner.

In accordance with the invention, the main conductive path through the ammeter is formed of two conductive strips 20 and 21 which have opposing re-entrant portions 22 and 23, respectively. The conductors 20 and 21 are then secured to one another at their ends, and receive the bolts 14 and 15 as a rigid subassembly. By way of example, the complete assemblage of bolts 14 and 15, and conductors 20 and 21 could be bolted together as by the nuts, best shown in FIGURE 3 as nuts 24 and 25 on bolts 14 and 15, respectively.

The re-entrant portions 22 and 23, in accordance with the invention, define both parallel current-carrying paths as well as a support cage for receiving the shaft 30 which carries pointer 12. That is to say, the shaft 30 could, for example, have pointed or, if desired, jeweled end surfaces which are received by suitable depressions in the re-entrant portions 22 and 23. One such depression is shown in FIGURE 1 as depression 31 in re-etrant portion 23, it being understood that a similar depression is available in the opposing surface of re-entrant portion 22.

The shaft 30 further has rigidly secured thereto permanent magnet washers or disks 40 and 41 adjacent the opposing ends of shaft 30 and adjacent the straight segments of re-entrantly shaped portions 22 and 23. The magnetic poles of washers 40 and 41, as illustrated in FIGURE 3, are diametrically opposed to one another. The pointer 12 is also secured to pin 30 in any desired manner.

Thus, the rigid subassembly of magnets 40 and 41, shaft 30 an pointer 12 is pivotally carried by the re-entrant portions 22 and 23 of the parallel connected conductors 20 and 21. If desired, small iron strips such as iron strips 50 and 51 shown in FIGURES 2 and 3 can be secured to the front plate 10 and pass through notches 52 and 53 in re-entrant portion 22 so as to overlie permanent magnet washer 40. Small adjustments of iron strips 50 and 51 are then made for zeroing the pointer position 12 as by bending or otherwise varying their proximity to magnets 40 and 41. Strips 50 and 51 further permit linear pointer deflection greater than the usual 70° common to other forms of moving magnet meters.

Figure 4:
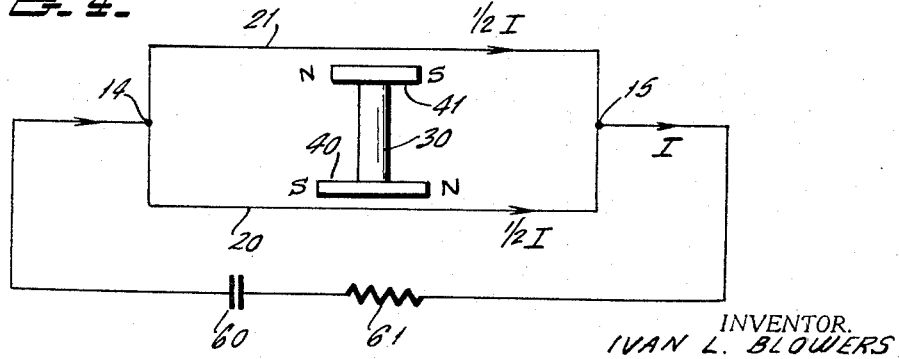
FIGURE 4 is a schmeatic circuit diagram for illustrating the operation of the ammeter of the invention.

The operation of the novel meter of FIGURES 1, 2 and 3 is best understood from the schematic circuit of FIGURE 4 which indicates a battery 60 connected in series with a load 61 and thence to the terminals 14 and 15 of the schematically illustrated parallel conductors 20 and 21.

The shaft 30 carrying magnets 40 and 41 is pivotally mounted so as to be capable of rotation on its own axis. If now a total current I flows in the circuit of FIGURE 4, this current will divide approximately equally in conductors 20 and 21 with ½I flowing in each of the conductors. The magnetic field generated by each of conductors 20 and 21 in the vicinity of permanent magnets 40 and 41, respectively, will cause the magnets to rotate, with the torque of both magnets 40 and 41 being in the same direction, thereby rotating shaft 30 and pointer 12 to a position dependent upon the current magnitude through conductors 20 and 21.

By using the two parallel paths in the manner illustrated in the drawings, it has been found that the sensitivity of the instrument is substantially increased so that while the ammeter can measure the relatively hight currents involved, for example, in the starting circuit of an automobile, the meter sensitivity is such that it can also measure currents down to approximately 25 amperes. In high current meters of the general type to which the meter of the invention belongs, such relatively low current sensitivity could not be achieved with the standard single conductor acting on a single permanent magnet.

In addition to increasing sensitivity, however, it will be apparent that the present invention permits simplified construction, since the two current paths further permit the formation of a mechanical support for the pivotally mounted pointer.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A high current ammeter; said high current ammeter including a dial, a pointer rotatably movable with respect to said dial, a shaft connected to said pointer, first and second permanent magnets connected to said shaft at opposite ends thereof, and first and second conductors; each of said first and second conductors comprised of generally flat members having opposing re-entrant portions therein defining a cage; said first and second conductors connected in parallel with one another; said shaft disposed within said cage and pivotally mounted at either end thereof to a portion of the said re-entrant portion of said first and second conductors, respectively; said first and second permanent magnets being adjacent said first and second conductors, respectively; said first and second permanent magnets being rotated in the same direction responsive to current flow in said first and second conductive members, respectively.

2. The device of claim 1 which further includes a back plate and a first and second terminal bolt; said first and second terminal bolts extending through the opposite ends of said first and second conductors and secured in said back plate; said first and second terminal bolts defining the terminals of said device.

3. The device of claim 1 wherein said permanent magnets are oppositely poled.

4. The device of claim 2 wherein said re-entrant portions are positioned in the middle of their respective first and second conductors.

5. The device of claim 3 wherein said permanent magnets are disk-shaped.

References Cited

UNITED STATES PATENTS

| | | | |
|---|---|---|---|
| 2,489,726 | 2/1950 | Towner | 324—146 X |
| 2,867,768 | 1/1959 | Fribance et al. | 324—151 X |
| 3,200,332 | 8/1965 | Pfeffer | 324—146 |

RUDOLPH V. ROLINEC, *Primary Examiner.*

P. A. URIBE, *Assistant Examiner.*